United States Patent
Lavine et al.

(10) Patent No.: US 9,329,827 B2
(45) Date of Patent: May 3, 2016

(54) CROPPING OF IMAGES FOR DISPLAY ON VARIABLY SIZED DISPLAY DEVICES

(75) Inventors: Adam Lavine, Livermore, CA (US); Yu-Jen Dennis Chen, Livermore, CA (US); Peter Rodgers, Livermore, CA (US)

(73) Assignee: FUNMOBILITY, INC., San Ramon, CA (US)

( * ) Notice: Subject to any disclaimer, the term of this patent is extended or adjusted under 35 U.S.C. 154(b) by 1496 days.

(21) Appl. No.: 11/312,719

(22) Filed: Dec. 20, 2005

(65) Prior Publication Data

US 2006/0139371 A1   Jun. 29, 2006

Related U.S. Application Data

(60) Provisional application No. 60/640,354, filed on Dec. 29, 2004.

(51) Int. Cl.
*G09G 5/14* (2006.01)
*G06F 3/14* (2006.01)
*H04M 1/725* (2006.01)

(52) U.S. Cl.
CPC ............ *G06F 3/14* (2013.01); *G09G 2340/145* (2013.01); *H04M 1/72544* (2013.01)

(58) Field of Classification Search
CPC ........................................................ G06F 3/14
USPC .................................. 345/620, 628; 382/298
See application file for complete search history.

(56) References Cited

U.S. PATENT DOCUMENTS

| | | | | |
|---|---|---|---|---|
| 5,146,548 A | * | 9/1992 | Bijnagte ...................... | 358/1.18 |
| 5,260,805 A | * | 11/1993 | Barrett .......................... | 358/449 |
| 5,414,811 A | * | 5/1995 | Parulski et al. ............... | 345/501 |
| 5,675,400 A | * | 10/1997 | Stephenson, III ............... | 355/40 |
| 5,901,253 A | * | 5/1999 | Tretter .......................... | 382/289 |
| 5,930,811 A | * | 7/1999 | Nojima et al. ................. | 715/247 |
| 6,049,636 A | * | 4/2000 | Yang .............................. | 382/289 |
| 6,356,283 B1 | * | 3/2002 | Guedalia ....................... | 715/760 |
| 6,931,661 B2 | * | 8/2005 | Smith ........................... | 725/133 |
| 7,162,102 B2 | * | 1/2007 | Cahill et al. .................. | 382/288 |
| 7,171,058 B2 | * | 1/2007 | Luo ............................... | 382/298 |
| 7,209,149 B2 | * | 4/2007 | Jogo ............................. | 345/622 |
| 7,251,349 B2 | * | 7/2007 | Najman et al. ................ | 382/113 |
| 7,308,158 B2 | * | 12/2007 | Herbert et al. ................ | 382/298 |
| 7,565,028 B2 | * | 7/2009 | Saed ............................. | 382/284 |

(Continued)

OTHER PUBLICATIONS

Automatic thumbnail cropping and its effectiveness Bongwon Suh, Haibin Ling, Benjamin B. Bederson, David W. Jacobs Nov. 2003 UIST '03: Proceedings of the 16th annual ACM symposium on User.*

(Continued)

*Primary Examiner* — Javid A Amini
(74) *Attorney, Agent, or Firm* — Maschoff Brennan

(57) ABSTRACT

Cropping source images for display on user devices. A source image is cropped and/or resized to correspond to dimensions of a display screen of a device by selecting an area of interest of the source image which will not be lost in the process of resizing the image. Coordinate points are positioned within the image to correspond to dimensions of the display screen on which the image will be displayed and the image is then cropped at the boundaries defined by the coordinate points which include a crop height and a crop width. If needed, the image is then scaled down proportionally to resize the image to a size that corresponds to the dimensions of the display screen of the device.

20 Claims, 3 Drawing Sheets

(56) References Cited

U.S. PATENT DOCUMENTS

| | | | |
|---|---|---|---|
| 7,634,715 B2* | 12/2009 | Hertzfeld et al. | 715/201 |
| 7,643,704 B2* | 1/2010 | Jackson et al. | 382/298 |
| 2001/0026277 A1* | 10/2001 | Dorrell | 345/474 |
| 2001/0055414 A1* | 12/2001 | Thieme | 382/135 |
| 2002/0154818 A1* | 10/2002 | Najman et al. | 382/199 |
| 2003/0044086 A1* | 3/2003 | Jia et al. | 382/296 |
| 2004/0001636 A1* | 1/2004 | Miceli et al. | 382/235 |
| 2004/0117735 A1* | 6/2004 | Breen | 715/517 |
| 2004/0141001 A1* | 7/2004 | Van Der Heyden | 345/723 |
| 2004/0196406 A1* | 10/2004 | Shimizu | 348/584 |
| 2004/0264762 A1* | 12/2004 | Mas et al. | 382/154 |
| 2005/0027823 A1* | 2/2005 | Rana | 709/219 |
| 2005/0055636 A1* | 3/2005 | Graves | 715/526 |
| 2006/0023077 A1* | 2/2006 | Alton et al. | 348/222.1 |
| 2006/0055693 A1* | 3/2006 | Sylthe et al. | 345/419 |
| 2006/0088228 A1* | 4/2006 | Marriott et al. | 382/305 |
| 2006/0204092 A1* | 9/2006 | Hamasaka et al. | 382/173 |
| 2010/0097397 A1* | 4/2010 | Huang | 345/629 |

OTHER PUBLICATIONS

Looking into video frames on small displays Xin Fan, Xing Xie, He-Qin Zhou, Wei-Ying Ma Nov. 2003 Multimedia '03: Proceedings of the eleventh ACM international conference on Multimedia.*

Architecture and performance of server-directed transcoding Björn Knutsson, Honghui Lu, Jeffrey Mogul, Bryan Hopkins Nov. 2003 ACM Transactions on Internet Technology (TOIT), vol. 3 Issue 4 Publisher: ACM.*

"Perception-based image transcoding for universal multimedia access" Keansub Lee; Hyun Sung Chang; Seong Soo Chun; Hyungseok Choi; Sanghoon Sull; Image Processing, 2001. Proceedings. Publication Year: 2001, pp. 475-478 vol. 2.*

Mohan, R.; Smith, J.R.; Chung-Sheng Li "Adapting multimedia Internet content for universal access Multimedia", IEEE Transactions on vol. 1, Issue: 1 Publication Year: 1999, pp. 104-114.*

\* cited by examiner

CROPPING OF IMAGES FOR DISPLAY ON VARIABLY SIZED DISPLAY DEVICES

CROSS REFERENCE TO RELATED APPLICATIONS

This application claims the benefit of U.S. Provisional Application Ser. No. 60/640,354, filed Dec. 29, 2004, which is hereby incorporated by reference in its entirety.

BACKGROUND OF THE INVENTION

1. The Field of the Invention

The present invention relates generally to processing images that are to be transmitted to electronic devices on a network. More particularly, the present invention relates to cropping and/or otherwise resizing images that are transmitted to portable electronic devices.

2. The Relevant Technology

Portable electronic devices, such as cellular telephones, personal digital assistants (PDAs), laptop computers, smart telephones, and other electronic devices are widely used for business and personal purposes. As usage of portable electronic devices has increased, a market for products and services related to portable electronic devices has developed. Users of portable electronic devices are provided with a wide variety of software, applications, and service choices to enhance the features and usage capabilities of portable electronic devices.

Many products and services available for use with portable electronic devices can be downloaded from networks, such as cellular telephone networks and the World Wide Web. For example, portable electronic device users can download games, ring tones, wallpaper, screen savers, graphics, and other applications directly from cellular telephone networks or the World Wide Web to their portable electronic devices. In this way, users can personalize their portable electronic devices as desired.

Images represent an example of a product that is commonly downloaded to a portable electronic device. The user can browse numerous images on a network and select a specific image for display on the display screen of the portable electronic device. More particularly, a user may wish to download an image to a cellular telephone and then display the image on the display screen of the cellular telephone as, for example, wallpaper.

Although images available to download can often be easily browsed, the process of downloading and displaying the image on the display screen of the cellular telephone may be somewhat complicated. Because there are a number of different cellular telephone manufacturers, and typically many models available from each manufacturer, the size and aspect ratio of cellular telephone display devices often varies from device to device.

Due to the difference in size and aspect ratio between images that may be selected to be downloaded and the display screen of the cellular telephone, an image is often resized in a variety of ways before the image is displayed. One way in which images are resized is by cropping. Cropping involves cutting away portions of an image that extend beyond the area available for displaying the image. For example, when a display screen of a cellular telephone is smaller than an image a user chooses to download, portions of the image that extend beyond a region the size of the display screen are cropped or cut away before the image is displayed on the display screen.

Unfortunately, the process of cropping an original image in order to display the image on a relatively small display screen can produce undesirable results. For example, if the difference between the size and aspect ratio of the original image and the size and aspect ratio of the display screen of a device is large, significant portions of the original image may be cropped before the image is displayed on the display screen of the device. The cropped portions may be so significant as to render the cropped image unrecognizable or no longer aesthetically pleasing to the user of the device to which the cropped image is downloaded. Furthermore, the process of cropping may produce a cropped image where integral aspects of the original image are missing.

In addition to cropping an image, resizing an image may include altering the dimensions of the image. The dimensions of an image may be altered when dimensions of the image are disproportionate to dimensions of a display screen on which the image will be displayed. For example, if an image is square but the display screen on which the image will be displayed is a rectangle with the y-axis having a length greater than the length of the x-axis, the dimensions of the image may be altered so that the x- and y-axes of the image are proportionate to the x- and y-axes of the display screen. Once the image is altered, the image can be downloaded to the cellular telephone and displayed on the display screen of the cellular telephone.

Just as cropping an image can present problems with the display of the cropped image, altering the dimensions of the image can also present problems with the display of the altered image. For example, when the dimensions of the image are altered certain aspects of the image may become distorted. In some instances, the distortion may also be so great as to render the image unrecognizable.

BRIEF SUMMARY OF THE INVENTION

These and other limitations are overcome by embodiments of the invention, which relate to systems and methods for cropping or resizing images. Embodiments of the present invention include cropping and/or resizing images to download and display on the display screen of an electronic device. When a user selects an image on a network to download and display on the user's electronic device, the image may need to be resized to fit the dimensions of the display screen of the electronic device. While portions of the image may need to be cropped, an area of interest of the image is included in the portion that is downloaded and displayed on the device. In addition, corner coordinate points define an area of the image, including the area of interest of the image, which corresponds to the dimensions of the display screen of the device. In the event that the image must be additionally scaled down in order to fit the display screen of the device, the image is, scaled down proportionally thereby avoiding any distortion of the image.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The drawings are not drawn to scale. The invention will be described and explained with additional specificity and detail through the use of the accompanying drawings in which.

DETAILED DESCRIPTION OF THE INVENTION

Reference will now be made to the drawings to describe various aspects of example embodiments of the invention. It should be understood that the drawings are diagrammatic and schematic representation of such example embodiments and, accordingly, are not limiting of the scope of the present invention, nor are the drawings necessarily drawn to scale.

In general, embodiments of the invention are concerned with displaying an image on the display screen of a device. In one embodiment, the display screen may be a display screen of a cellular telephone. In order to ensure that key aspects of an image are not lost when the image is downloaded to a display screen, the present invention defines an area of interest of the image which is included in the portion of the image downloaded to a display screen.

In addition to including the area of interest of the image on the display screen, embodiments of the present invention include corner coordinates which define an area, surrounding the area of interest of the image, which is proportional to the dimensions of the display screen of the device. Once the area of the image is defined using the corner coordinates, the image is downloaded to the display screen of the device.

Embodiments of the invention include sizing or cropping an image in response to a request from a user. One of skill in the art can appreciate that the images can be cropped or sized prior to receiving requests. An image can be cropped multiple times in order to comply with various displays. These pre-cropped images are then stored at the server. In this case, the server can then select the properly sized in response to a user request. This can improve the speed with which an image is delivered to a device.

Figure 1:
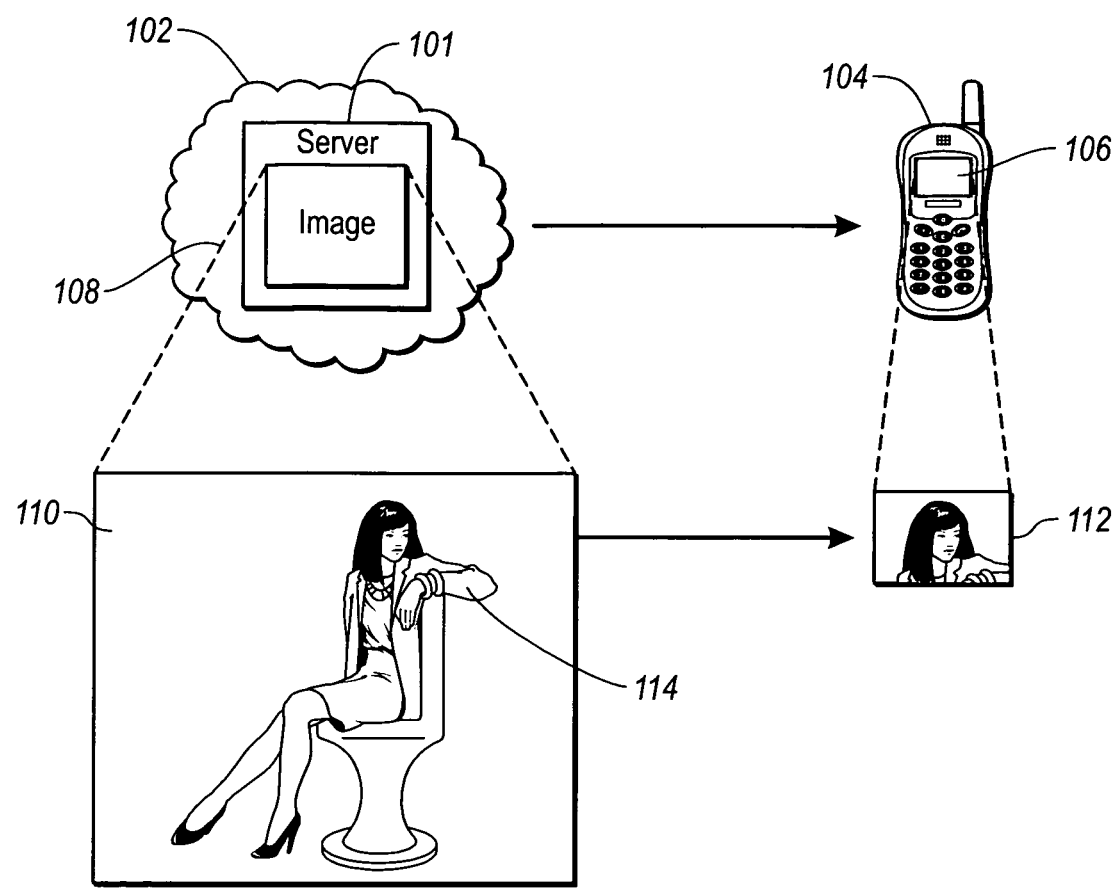
FIG. 1 illustrates a communication environment in which an image can be downloaded to a communication device.

FIG. 1 illustrates a communication device connected to a network 102. Network 102 may be a cellular telephone network (including a cellular communication link), the World Wide Web or another aspect of the Internet, a Local Area Network (LAN), or any other network. A communication device may be connected to network 102 via a wireless connection, such as those used in cellular telephone networks, an 802.11 connection, a Bluetooth connection, or any other wireless connection, or a communication device may be connected to network 104 via a wired connection.

In the embodiment shown in FIG. 1, the device 104, which is a cellular telephone in this example, includes a display screen 106. In addition to cellular telephones, devices 104 that may be employed in connection with the present invention include computers, laptop computers, personal digital assistants (PDAs), smart telephones, and any other communication device having a mechanism for presenting images or other graphical information.

While operating the device 104 within the communications environment or network 102 shown in FIG. 1, the user of the device 104 may wish to download a variety of data stored on the network 102 to the device 104. Examples of data stored on the network 102 include games, ring tones, screen savers, wallpaper, graphics, and other applications.

In this case, the data that is downloaded from the image servers 101 over the network 102 is an image 108. The user of device 104 browses images and other applications available from the image server 101 over the network 102 and determines which image or application on network 102 the user wishes to download. Once the image 108 to be downloaded and displayed on the display screen 106 of device 104 is selected, the image server 101 that operates in the network resizes the image 108 so that the image can be properly displayed on the display screen of the device 104. Although the images can be used for any purpose on the display device 104, it is common for images to be used as wallpaper that is displayed on the background of the user interface rendered on the display device.

When the image 108 is resized to fit the parameters of the display screen 106 of the device 104, the resizing involves manipulation of the original image 110. The original image 110 may have much larger dimensions than the display screen 106 of the device 104. In order to display the image 108 on the display screen 106 of the device 104, original image 110 is cropped and/or resized to fit the dimensions of display screen 106, as shown by cropped and/or resized image 112.

When the image server 101 in the network 102 receives a request for an image, the request includes information identifying the cellular telephone or other electronics device on which the image is to be displayed. This information identifies or can be used to identify the size and aspect ratio of the display screen 106 of the device 104 and these parameters are used to select the manner in which the image is cropped or resized or to select a pre-cropped image from the server 101. The information identifying the device 104 included in the request can include a code that specifies the manufacturer and model of the cellular telephone. Alternately, the information can include information identifying a particular user or subscriber, which is then used at the image server to access a database that lists the cellular telephone models that are used by each user or subscriber. Further information regarding image servers, cellular networks, and image selection systems with which the invention can be used is included in U.S. Provisional Patent Application Ser. No. 60/627,602, entitled "Displaying Customized Images on a Wireless Device," and filed Nov. 12, 2004, which is incorporated herein by reference.

Although the original image 110 is manipulated to become cropped image 112, an area of interest of the original image 110 is preserved in cropped image 112. The area of interest can be of any shape or may relate to a particular aspect or feature of an image. For example, the area of interest of the original image 110 is the head of figure 114 in the image 110. When original image 110 is cropped, the head of figure 114 is included in the cropped image 112 that is generated and transmitted for display on the display screen 106 of device 104. Although aspects of original image 110 beyond the head of figure 114 may or may not be included in cropped image 112, depending on the dimensions of display screen 106, the area or interest, which is the head of the figure 114, will be included in cropped image 112.

In addition to cropping original image 110 to create a cropped image 112 which is proportional to the dimensions of the display screen 106 of device 104, the cropped image may be proportionally scaled, if needed. For example, original image 110 may be very large in comparison to display screen 106. Although the cropping process may produce a cropped image 112 which is proportionate to display screen 106, and includes area of interest 114 of the original image 110, the cropped image may still be larger than the display screen 106 of device 104. In order for cropped image 112 to be displayed on display screen 106, an additional process of proportionately scaling down (i.e. resizing) the cropped image 112 is performed. Cropped image 112 will be proportionately scaled down until cropped image 112 has the same dimensions as display screen 106. Scaling down cropped image 112 proportionately ensures that cropped image 112 is not distorted when cropped image 112 is displayed on display screen 106 of device 104.

Figure 2:
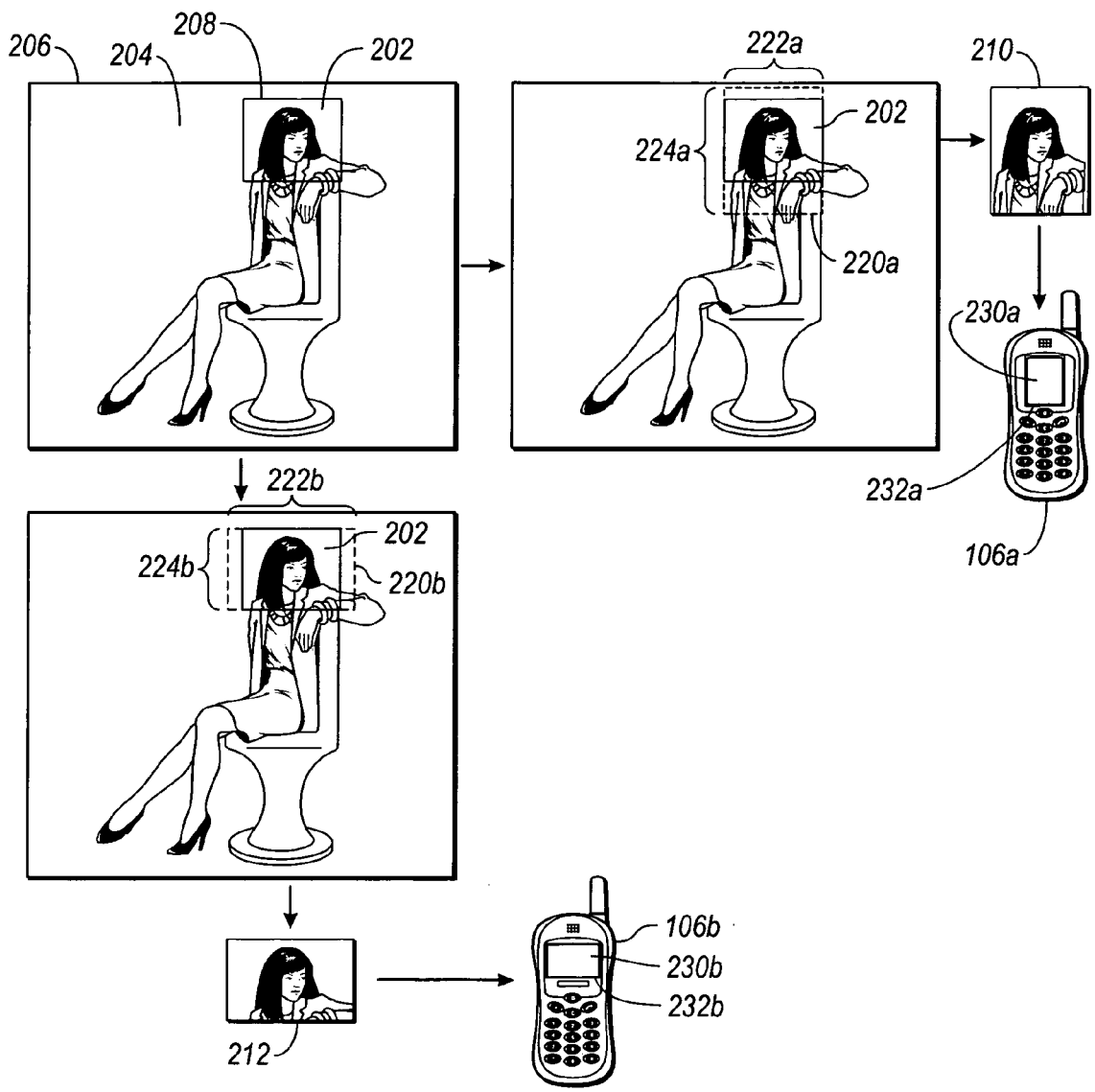
FIG. 2 illustrates a method for determining a portion of an image to be downloaded to a display screen of a communication device.

An example method for determining how the original image 110 can be manipulated to be displayed on display screen 106 is further illustrated in FIG. 2. The area of interest 202 of the image 204, which is the region of the image that will be included in any cropped image, regardless of the amount of cropping to be performed, is defined by the artist of the image 204 or another person. When a user of a cellular telephone, such as the device 106a with a screen 230a or the device 106b with a display screen 230b, or other device having a display screen, selects image 204 to download to the device's display screen, the dimensions of the display screen are compared to the dimensions of the image 204. The image 204 is subsequently cropped to conform to the dimensions of the display screen of the user's device.

For example, the display screen 230a of the device 106a has a different aspect ratio and size than the display screen 230b of the device 106b. As a result, the original image 204 is cropped differently for each device. In both instances, the area of interest 202 is included in the image that is delivered to the devices 106a and 106b. The image 210 is delivered to the device 106a and the image 212 is delivered to the device 106b. In each case, the image 210 and the image 212 each include the area of interest 202, but are cropped differently based on the characteristics of the displays 230a and 230b.

As noted herein, methods of the invention permit a source image to be resized, cropped, or both, to be adapted for display on a display device while preserving an area of interest. Embodiments of the invention extend to a variety of algorithms that achieve this result. Although various embodiments of the invention exist, a specific method that achieves these results in a particularly efficient and effective manner is presented hereinbelow.

In this embodiment, for convenience in describing the methods for adjusting (cropping, resizing, etc.) the image, certain dimensions, parameters, constructs, and values are defined below. First, bounding rectangles associated with the image processing techniques of this embodiment include the following:

Source-Rectangle=bounding rectangle of the source image (e.g., source rectangle 206 bounding the image 204);

Device-Rectangle=bounding rectangle of the device display (e.g., the device rectangle 232a and 232b of the devices 230a and 230b);

Interest-Rectangle=bounding rectangle of the area of interest (e.g., interest rectangle 208 bounding the area of interest 202 (in this example, the interest-rectangle is completely enclosed within Source-Rectangle).

The following terms are defined to represent the values of the cropped width and cropped height of the source image so that the portion of the image within the Interest-Rectangle 208, which is the area of interest 202, can be displayed completely within the Device-Rectangle 232a of the display 230a or the Device-Rectangle 232b of the display 230b:

Crop-Width=width of the crop area (e.g. the width 222a or the width 222b, respectively, of rectangles 220a and 220b);

Crop-Height=height of the crop area (e.g. the height 224a or the height 224b, respectively, of the rectangles 220a and 220b);

Crop-Rectangle=bounding rectangle of the region of the source image that completely includes the Interest-Rectangle and is to be displayed within the Device-Rectangle. The Crop-Rectangles 220a and 220b each have a width equal to Crop-Width and a height equal to Crop-Height and the Crop-Rectangle 220a and 220b include the area of interest 202. Of course, the Crop-Height and the Crop-Width may vary from one device to the next.

In general, this exemplary method is used to determine the value of the Crop-Width 222a or 222b and the Crop-Height 224a or 224b and to determine the position of the corresponding Crop-Rectangle 220a or 220b within the Source-Rectangle 206 or of the image 204.

As part of the calculations, certain aspect ratio values are defined as follows:

A(S)=Aspect Ratio (width divided by height) of the Source-Rectangle, which is the aspect ratio of the image 204 in this example;

A(D)=Aspect Ratio of the Device-Rectangle, which is the aspect ration of the device rectangles 230a or 230b in this example;

A(I)=Aspect Ratio of the Interest-Rectangle, which is the aspect ration of the area of interest 202;

A(C)=Aspect Ratio of the Crop-Rectangle, which is the aspect ratio of the crop rectangles 220a and 220b in this example and is generally equal to the aspect ratio of the device rectangles 230a or 230b.

The following pseudocode represents exemplary steps and/or acts of a method for preparing an image for a device. The first routine is performed if the aspect ratio of the Device-Rectangle (e.g., the aspect ratio of the rectangles 230a and 230b) is less than the aspect ratio of the Interest-Rectangle (e.g., the aspect ratio of the area of interest 202). In other words, this routine is performed when the Interest-Rectangle has a "wider" aspect ratio than the Device-Rectangle. Under these circumstances, the practical result of performing the following routine is that the source image is cropped more extensively in the height dimension, which causes the cropped area to fit the display device. In other words, this cropping causes the aspect ratio of the Crop-Rectangle (i.e., A(C)) to equal the aspect ratio of the display device (i.e., A(D)). This routine is defined as follows:

```
if (A(D) < A(I)
    {Crop-Height = Width of Interest-Rectangle / A(D)
    if (Crop-Height > Height of the Source-Rectangle)
        Crop-Height = Height of the Source-Rectangle
    else if (Crop-Height < Height of the Device-Rectangle)
        Crop-Height = Height of the Device-Rectangle
    Crop-Width = Crop-Height * A(D)}
```

Another routine is performed if the aspect ratio of the Device-Rectangle is greater than the aspect ratio of the Interest-Rectangle. In other words, this second routine is performed when the Interest-Rectangle has a "narrower" aspect ratio than the Device-Rectangle. Under these circumstances, the practical result of performing the following routine is that the source image is cropped more extensively in the width dimension, which causes the cropped area to fit the display device. In other words, this cropping causes the aspect ratio of the Crop-Rectangle (i.e., A(C)) to equal the aspect ratio of the display device (i.e., A(D)). It is also noted that this second routine is typically performed when the aspect ratios of the Device-Rectangle and the aspect ratio Interest-Rectangle are the same. This second routine is defined as follows:

```
else if (A(D) > A(D)
    {Crop-Width = Height of Interest-Rectangle * A(D)
    if (Crop-Width > Width of the Source-Rectangle)
        Crop-Width = Width of the Source-Rectangle
    else if (Crop-Width < Width of the Device-Rectangle)
        Crop-Width = Width of the Device-Rectangle
    Crop-Height Crop-Width / A(D)}
```

With the values of Crop-Height and Crop-Width, the Crop-Rectangle can be identified:
Crop-Rectangle=Rectangle with the following:
  width equal to Crop-Width;
  height equal to Crop-Height;
  centered at the center of Interest-Rectangle;
    If the Crop-Rectangle is not enclosed by the bounds of the Source-Rectangle, translate the rectangle either by the x-axis or the y-axis until the Crop-Rectangle is enclosed by the Source-Rectangle.

In the instance that the Crop-Rectangle cannot be centered about the area of interest for any reason, the location of the Crop-Rectangle can be adjusted. For example, referring to FIG. 2, and in particular rectangle 220a, it can be appreciated that if rectangle 220a were centered about the area of interest 202 it would extend beyond the boundaries of the image 204. In this instance, the location of the rectangle 220a can be adjusted off of center (i.e. downward in FIG. 2) so as to include the area of interest and retain the aspect ratio of the display screen 230a.

Finally, the portion of the source image within Crop-Rectangle is resized, if necessary, to fit the Device-Rectangle. FIG. 2 illustrates the portion of the image cropped. For the device 106a, the image bounded by the rectangle 220a includes the area of interest 202. The dashed lines of the rectangle 220a indicate that the image 210 delivered to the device 106a includes more of the image in the height aspect. For the device 106b, the image 212 delivered to the device also includes the area of interest 202. The dashed lines of the rectangle 220b indicate that the image 212 delivered to the device 106b includes more of the image in the width direction. In other words, the process used to generate the images 210 and 212 accounted for the aspect ratio of the devices 106a and 106b, while still including the area of interest 202 of the image 204.

When a user selects the image 204 to download to the display screen 230a and 230b of the user's device 106a and 106b, the user may not know which portion of image 204 will be cropped and which portion of image 204 will be displayed on the display screen 230a and 230b. In one embodiment, the user can preview the portion of image 204 that will be displayed on the display screen 230a and 230b of the user's device 106a and 106b. After the user selects the image 204 to display on the user's device 106a and 106b, the cropping process is performed with reference to the dimensions of the display screen of the user's device. Once the cropping process is completed, the user can view the portion of the image 204, including area of interest 202, that will be displayed on the display screen 230a and 230b of the user's device 106a and 106b. Through the connection between the device of the user and the network on which the image resides, as shown in FIG. 1, the user can view the cropped portion of the image 204 that will be displayed on the display screen 230a and 230b of the user's device 106a and 106b.

Figure 3:
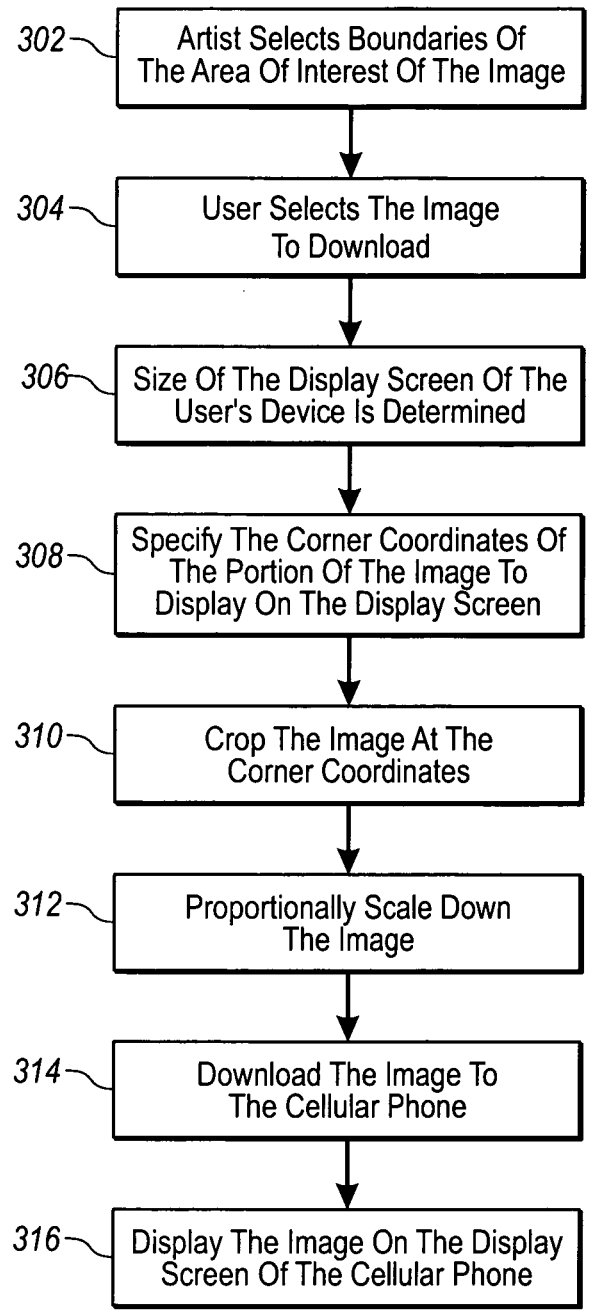
FIG. 3 shows a process for selecting and downloading an image or portion of an image to a display screen of a communication device.

FIG. 3 illustrates an embodiment of a process for cropping an image to be displayed on the display screen of a device while ensuring that the area of interest of the image is not lost in the cropping process. The exemplary method of FIG. 3 can incorporate the specific steps or acts described above using pseudocode, or can alternately include other steps that achieve the result of cropping the source image such that the area of interest is preserved and is displayed within the display device. Some of the steps or acts illustrated in FIG. 3 are not performed each time an image is requested by a user, but may have been previously performed. For example, selecting an area or interest can occur a single time for a given image. Once the area of interest is known, the image can then cropped for various devices each time the image is requested. Alternatively, the image can be cropped and/or scaled beforehand for a variety of different display screens. This can reduce the time needed to transmit an image to a device as the cropping and/or scaling has already been performed. Thus, the exemplary method of FIG. 3 exemplary begins with an artist selecting 302 an area of interest for an image, but one of skill in the art can appreciate that step 302 may be omitted and that the process may begin when an image is selected 304 for download by a user.

When the image is created by an artist, the artist selects 302 the area of interest of the image which should be included when the image is downloaded to a display screen of a device. Once the area of interest has been identified, the image can be stored and then ready to be used in response to user requests. The area of interest can be changed by the artist at any time. Next, the user selects 304 the image to download to the display screen of the user's device. Once the user has selected the image the user wishes to download, the size of the display screen of the user's device is determined 306. The corner coordinates of the portion of the image to be displayed on the display screen of the users' device, which includes the area of interest defined by the artist, are specified 308.

Identifying the corner coordinates may include one or more of the procedures described above relating to cropping the image. The corner coordinates can be defined, for example, once the crop width and crop height of the crop rectangle are determined and the resulting crop rectangle is centered on the area of interest. By centering the crop rectangle on the area of interest, the corner coordinates can then be determined with respect to the image. The image can then be cropped using the corner coordinates.

After the corner coordinates have been specified and the portion of the image to be displayed on the display screen of the user's device has been defined, the original image is cropped 310 at the corner coordinates. Further scaling down or resizing 312 of the image to fit the dimensions of the display screen, if needed, is then performed. As previously indicated, the scaling of the cropped image is typically proportional in nature to prevent distortion of the image. Once the image has been cropped and scaled down, if needed, the image is then downloaded 314 to the user's device. After the image has been downloaded the user's device, the image is displayed 316 on the display screen of the user's device.

By using the process described above to crop and scale down (if necessary) images to fit display screens of devices, the present invention provides a way for images to be displayed on display screens of mobile devices while ensuring that regardless of any cropping or scaling down which may be needed, the area of interest of the image will be displayed on the display screen of the device. In addition, the process of cropping and scaling down images to fit display screens of devices as shown in the present invention ensures that an image is not distorted when the image is downloaded to a device which may have disproportionate dimensions when compared to the dimensions of the original image.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for preparing a source image for display on a display screen of a device, the method comprising:
   prior to receiving a request for the source image for display on the display screen of the device:
      storing the source image on a server having at least one processor, an area of interest defined within the source image, the area of interest comprising a region of the image bounded by a crop rectangle;
      preparing a plurality of cropped images from the source image with the server, each of the cropped images of the plurality comprising the area of interest, at least some of the cropped images of the plurality having different dimensions, wherein preparing each of the cropped images comprises:
         positioning coordinate points with the server within the source image to correspond to dimensions of the display screen of the device, such that the area of interest is included within the coordinate points, the coordinate points defining the crop rectangle;
         centering the crop rectangle on the area of interest, wherein the crop rectangle is translated in at least one of an x-axis or a y-axis when the crop rectangle extends beyond boundaries of the source image to place the crop rectangle within the boundaries of the source image; and
         cropping the source image at the coordinate points to generate a cropped image bounded by the crop rectangle, wherein the extent, if any, to which portions of the source image other than the area of interest are included in the cropped image depends upon the size of the display screen, wherein the cropped image is included in the plurality of cropped images; and
      storing the plurality of cropped images at the server;
   receiving, at the server, the request for the source image for display on the display screen of the device;
   identifying one of the plurality of cropped images having dimensions corresponding to those of the display screen of the device; and
   sending the one of the cropped images to the device from the server.

2. The method of claim 1, wherein an aspect ratio of the display screen is less than an aspect ratio of the area of interest, wherein positioning coordinate points within the source image further comprises:
   determining a crop height and a crop width that define a crop rectangle including the coordinate points, comprising one or more of:
      setting the crop height equal to a width of the area of interest divided by the aspect ratio of the display screen, the display screen defined by a device rectangle, wherein:
         when the crop height is greater than a height of a source rectangle defining the source image, setting the crop height to the height of the source rectangle; and
         when the crop height is less than a height of the device rectangle, setting the crop height to the height of the device rectangle; and
      setting the crop width equal to the crop height multiplied by the aspect ratio of the display screen.

3. The method of claim 1, wherein an aspect ratio of the display screen is greater than an aspect ratio of the area of interest, wherein positioning coordinate points within the source image further comprises:
   determining a crop height and a crop width that define the crop rectangle including the coordinate points, comprising one or more of:
      setting the crop width equal to a height of the area of interest multiplied by the aspect ratio of the display screen, the display screen defined by a device rectangle; wherein:
         when the crop width is greater than a width of a source rectangle defining the source image, setting the crop width equal to the width of the source rectangle; and
         when the crop width is less than a width of the device rectangle, setting the crop width equal to the width of the device rectangle; and
      setting the crop height equal to the crop width divided by the aspect ratio of the display screen.

4. The method of claim 1, wherein cropping the source image at the coordinate points to generate a cropped image further comprises scaling the cropped image proportionally such that the crop image fits the display screen of the device.

5. The method of claim 1, wherein receiving, at the server, the request for the source image for display on the display screen of the device comprises receiving, at the server, the request for the source image for display on the display screen of the device comprising at least one of:
   a computer;
   a laptop computer;
   a personal digital assistant; and
   a telephone.

6. The method of claim 1, wherein sending the one of the plurality cropped images to the device comprises sending the one of the cropped images to a cellular telephone, wherein the one of the plurality of cropped images is configured for display as wallpaper on the display screen of the cellular telephone.

7. The method of claim 6, wherein sending the one of the plurality of cropped images to a cellular telephone comprises sending the one of the plurality of cropped images for download to the cellular telephone over a network, the network comprising at least one of:
   the Internet;
   a local area network;
   a wireless connection;
   an 802.11 connection;
   a Bluetooth connection;
   a wired connection; and
   a wireless cellular communication link.

8. The method of claim 1, further comprising selecting the source image from a plurality of source images using a user interface of the device.

9. The method of claim 1, wherein positioning coordinate points comprises positioning the coordinate points based on information received from the device via a network, the information including at least one of:
   information describing the size of the display screen;
   information identifying a model of the device;
   information identifying a user of the device;
   information identifying a manufacturer of the device; and information including the coordinate points defining a device rectangle that bounds the display screen.

10. A method for displaying at least a portion of a source image on a display of a display device, the method comprising:
   storing the source image at a server comprising at least one processor, the source image comprising an interest rectangle defined by an interest aspect ratio and bounding an area of interest within the source image, the area of interest defined before the storing the source image;
   receiving a request for the source image, the request comprising information defining a device rectangle for displaying the source image, the device rectangle having a device aspect ratio;
   preparing, before receiving the request for the source image, a plurality of cropped images including the interest rectangle, the preparing comprising:
      aligning a center of a crop rectangle with a center of the interest rectangle with the server, wherein the crop rectangle is translated in at least one of an x-axis and a y-axis when the crop rectangle extends beyond boundaries of the source image to place the crop rectangle within the boundaries of the source image;
      cropping the source image to an area defined by the crop rectangle, the crop rectangle including both the area of interest, and portions of the source image not included in the area of interest, and cropping the source image further comprising:
      when the interest aspect ratio is greater than the device aspect ratio:
         cropping the source image more extensively in the height dimension such that the crop rectangle defining the boundary of the cropped source image is defined by a cropped aspect ratio that is equal to the device aspect ratio; and
      when the interest aspect ratio is less than the device aspect ratio:
         cropping the source image more extensively in the width dimension such that the crop rectangle defining the boundary of the cropped source image is defined by the cropped aspect ratio that is equal to the device aspect ratio; and
      resizing the cropped source image such that the cropped source image has the same dimensions as the device rectangle; and
   selecting a cropped image from the plurality of cropped images, the cropped image including the interest rectangle bounding the area of interest within the selected source image;
   delivering the cropped image to the device.

11. The method of claim 10, wherein receiving information defining a device rectangle for displaying the source image comprises receiving the information comprising at least one of:
   information describing a size of the display;
   information identifying a model of the device;
   information identifying a user of the device;
   information identifying a manufacturer of the device; or
   information including coordinates defining the device rectangle.

12. The method of claim 10, wherein receiving information defining a device rectangle for displaying the source image comprises receiving the information from the device comprising at least one of:
   a computer;
   a laptop computer;
   a personal digital assistant; or
   a telephone.

13. The method of claim 10, wherein delivering the cropped image to the device comprises delivering the cropped image to a cellular telephone, wherein the display is a display screen of the cellular telephone.

14. The method of claim 13, wherein delivering the cropped image to a cellular telephone comprises providing the cropped image for download to the cellular telephone over a network, the network comprising at least one of:
   the Internet;
   a local area network;
   a wireless connection;
   an 802.11 connection;
   a Bluetooth connection;
   a wired connection; or
   a wireless cellular communication link.

15. The method of claim 10, wherein receiving a request for the source image at a server including at least one processor comprises receiving the request from a user via a user interface of the device.

16. The method of claim 10, further comprising storing the plurality of cropped images in an image database.

17. The method of claim 10, further comprising downloading to the device the cropped source image for user acceptance or rejection.

18. A method for displaying a source image on a cellular telephone, the method comprising:
   generating a plurality of cropped images from a source image prior to displaying the source image on the cellular telephone, each of the plurality of cropped images comprising a predetermined area of interest, the generating comprising:
      identifying a center of the predetermined area of interest in the source image;
      cropping the source image to create a cropped image, the cropped image centered around the predetermined area of interest and including at least the predetermined area of interest of the source image, the cropped image having the same aspect ratio as the aspect ratio of the display screen; and
      resizing the cropped image to have dimensions less than or equal to the display screen such that the predetermined area of interest is included in the cropped image;
   storing the plurality of cropped images using a storage device, each of the plurality of cropped images associated with the predetermined area of interest;
   receiving a request for the source image at a server having at least one processor, the request comprising information identifying dimensions and an aspect ratio of a display screen of the cellular telephone;
   selecting at least one of the plurality of cropped images associated with the requested source image based on the request; and
   delivering the selected cropped image to the cellular telephone.

19. The method according to claim 18, further comprising downloading the selected cropped image to the cellular telephone via a network.

20. The method according to claim 18, wherein cropping the source image further comprises:
   determining a crop height and a crop width of the cropped image, wherein:
      when the aspect ratio of the display screen is less than an aspect ratio of the predetermined area of interest:
         setting the cropheight equal to a width of the predetermined area of interest divided by the aspect ratio of the display screen, the display screen defined by a device rectangle, wherein:

when the cropheight is greater than a height of a source rectangle defining the source image, setting the crop height to the height of the source rectangle; and when the cropheight is less than a height of the device rectangle, setting the crop height to the height of the device rectangle; and setting the crop width equal to the crop height multiplied by the aspect ratio of the display screen; and when the aspect ratio of the display screen is greater than the aspect ratio of the predetermined area of interest:

setting the cropwidth equal to a height of the predetermined area of interest multiplied by the aspect ratio of the display screen, the display screen defined by the device rectangle; wherein:

when the crop width is greater than a width of the source rectangle defining the source image, setting the crop width equal to the width of the source rectangle; and when the crop width is less than a width of the device rectangle, setting the crop width equal to the width of the device rectangle; and setting the crop height equal to the crop width divided by the aspect ratio of the display screen.

* * * * *